United States Patent [19]
Park

[11] Patent Number: 5,936,166
[45] Date of Patent: Aug. 10, 1999

[54] INPUT TORQUE DETECTING SYSTEM FOR AN AUTOMOTIVE TRANSMISSION

[75] Inventor: Dong Hoon Park, Kyungki-do, Rep. of Korea

[73] Assignee: Hyundai Motor Company, Seoul, Rep. of Korea

[21] Appl. No.: 08/915,866

[22] Filed: Aug. 21, 1997

[30] Foreign Application Priority Data

Aug. 30, 1996 [KR] Rep. of Korea ....................... 96-36761

[51] Int. Cl.⁶ .......................... G01M 13/02; G01M 19/00
[52] U.S. Cl. ....................................... 73/862.37; 73/118.1
[58] Field of Search .................................. 73/49.7, 118.1, 73/862.323, 862.37

[56] References Cited

U.S. PATENT DOCUMENTS

| | | | |
|---|---|---|---|
| 3,354,709 | 11/1967 | Wiggermann | 73/862.37 |
| 3,587,304 | 6/1971 | Eckart | 73/862.37 |
| 3,664,474 | 5/1972 | Blake et al. | 73/862.37 |
| 4,468,958 | 9/1984 | Takeshita | 73/118.1 |
| 4,809,544 | 3/1989 | Magoolaghan | 73/118.1 |
| 5,445,016 | 8/1995 | Neisebauer | 73/118.1 |
| 5,726,353 | 3/1989 | Matsuda et al. | 73/118.1 |

OTHER PUBLICATIONS

McGraw–Hill Encyclopedia of Science and Technology, McGraw–Hill, 1977, pp. 711–712, Jan. 1977

*Primary Examiner*—George Dombroske
*Attorney, Agent, or Firm*—Birch, Stewart, Kolasch, & Birch, LLP

[57] ABSTRACT

An input torque detecting system of an automotive transmission. The transmission comprises a torque convertor having a pump impeller directly connected to a crankshaft of an engine, a turbine runner disposed opposing to the pump impeller to rotate by fluid thrown from the pump impeller, and a stator disposed between the pump impeller and the turbine runner to redirect the fluid flow back to the same direction as impeller rotation to assist impeller rotation. The input torque detecting system includes a reacting shaft disposed around the input shaft and fixed on one end to the stator, an input torque transmitting device fixed on the other end of the reacting shaft, the input torque transmitting device being pivotable by a predetermined angle in accordance with a rotation of the stator, a torque-hydraulic pressure converter converting input torque transmitted from the input torque transmitting device into hydraulic pressure, and a detector detecting a level of converted hydraulic pressure.

11 Claims, 3 Drawing Sheets

INPUT TORQUE DETECTING SYSTEM FOR AN AUTOMOTIVE TRANSMISSION

FIELD OF THE INVENTION

The present invention relates an input torque detecting system for an automotive transmission, and more particularly, to a system for detecting an input torque used for either line pressure control in an automatic transmission or output control in a continuously variable transmission.

BACKGROUND OF THE INVENTION

Generally, in an automatic transmission and a continuously variable transmission, an input torque of an engine is determined by a transmission control unit using an engine RPM signal, a throttle valve opening signal, and an input speed signal of the transmission. The input torque is transmitted to each control means to aid in improving the shifting operation.

This method of determining input torque, however, has a drawback in that since signals which are not closely related to the input torque of the transmission are used as input signals by the TCU to determine input torque, the possibility of error is increased, resulting in deterioration of the shift quality in the case of the automatic transmission and disallowing pressure of a drive or driven pulley to be optimally controlled in accordance with changes in running condition in the case of the continuously variable transmission.

SUMMARY OF THE INVENTION

For the foregoing reason, there is a need for an input torque detecting system which can precisely detect input torque so as to improve shift quality.

According to a feature of the invention, an input torque detecting system of an automotive transmission comprising a torque convertor having a pump impeller directly connected to a crankshaft of an engine, a turbine runner disposed opposing to the pump impeller to rotate by fluid thrown from the pump impeller, and a stator disposed between the pump impeller and the turbine runner to redirect the fluid flow back to the same direction as impeller rotation to assist impeller rotation comprises a reacting shaft disposed around the input shaft and fixed on one end to the stator, an input torque transmitting device fixed on the other end of the reacting shaft, the input torque transmitting device being pivotable by a predetermined angle in accordance with a rotation of the stator, a torque-hydraulic pressure converter converting input torque transmitted from the input torque transmitting device into hydraulic pressure, and a detector detecting a level of converted hydraulic pressure.

The input torque transmitting device comprises a pivot cam member pivotally disposed in a receiving space of a transmission case, and an elastic member disposed between the pivot cam member and a wall of the transmission case defining the receiving space so as to bias the pivot cam member against a pivot direction of the pivot cam member.

The torque-hydraulic pressure converter comprises a valve body having a first passage supplied with hydraulic pressure from a fluid pump and a second passage supplying hydraulic pressure fed through the first passage to the detector, and communication regulating means for regulating communication of the first passage with the second passage in accordance with a pivotal movement of the pivot cam member.

The communication regulating means comprises a piston spool cooperating with the pivotal movement of the pivot cam member and a valve spool cooperating with the piston spool for regulating the communication of the first and second passages, the valve spool and the piston spool being disposed in the valve body.

The piston spool is provided with a roller contacting the pivot cam member, a surface of the pivot cam member contacting the roller being sloped.

An elastic member is disposed between the valve spool and the piston spool.

Part of the hydraulic pressure fed to the second passage is applied to the valve spool through a branch passage branched off from the second passage so as to bias the valve spool against a displacement of the piston spool, thereby preventing the valve spool from being abruptly displaced.

An orifice member is disposed within the branch passage.

The detector comprises a pressure sensor detecting a level of supplied pressure and a transmission control unit receiving a detected signal from the pressure sensor.

BRIEF DESCRIPTION OF THE DRAWINGS

Further objects and other advantages of the present invention will become apparent from the following description in conjunction with the attached drawings, in which.

DETAILED DESCRIPTION OF PREFERRED EMBODIMENT

Figure 1:
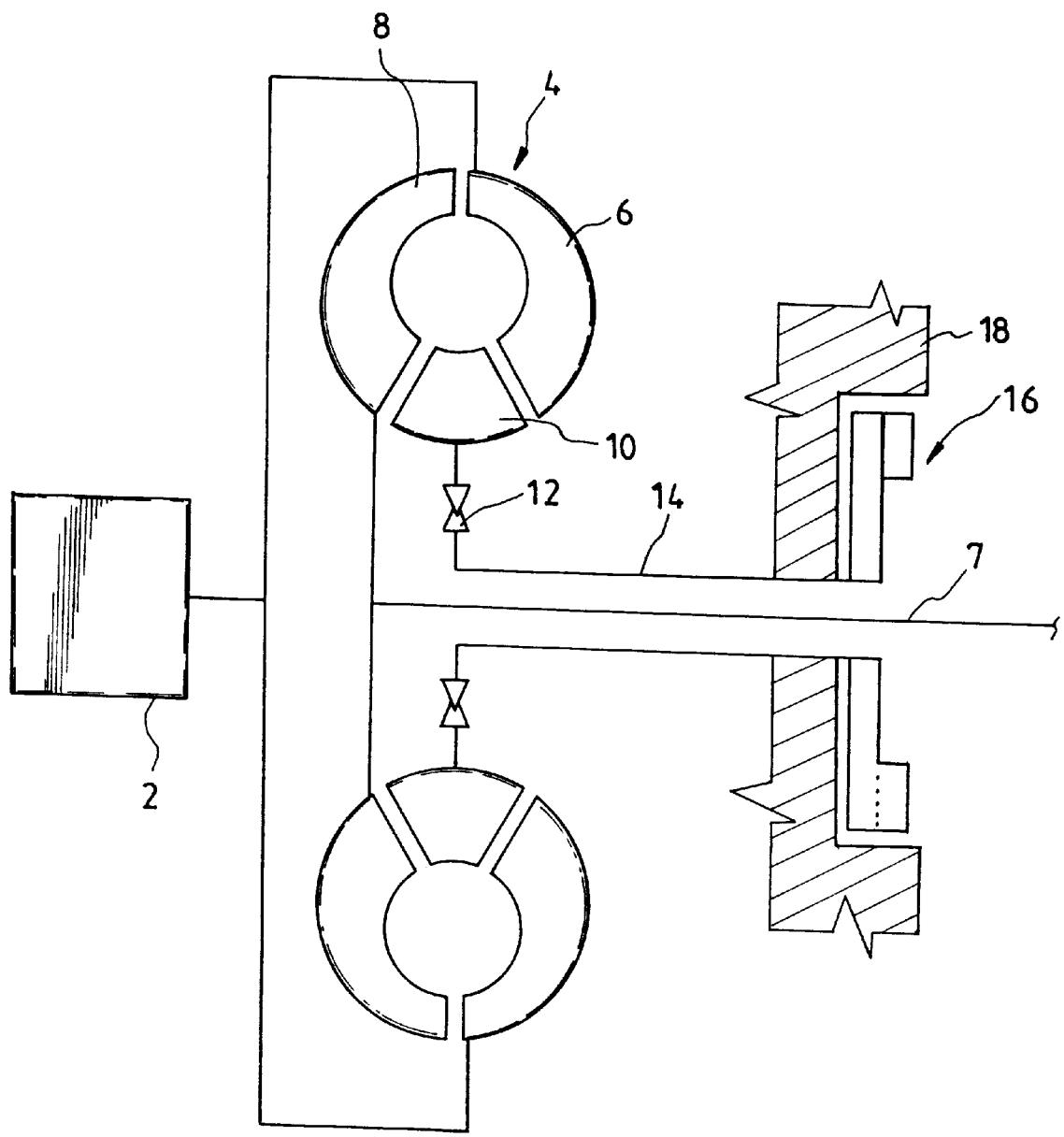
FIG. 1 is a partial schematic view of an automatic transmission where an input torque detecting system according to a preferred embodiment of the present invention is applied.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

Referring to FIG. 1, there is shown a schematic view of a transmission where an input torque detecting system of the present invention is applied. The transmission may be an automatic transmission or a continuously variable transmission connected to an engine 2 through a torque converter 4.

The torque converter 4 connects a crankshaft of an engine 2 to an input shaft 7 of the transmission and comprises a pump impeller 6 directly connected to the crankshaft of the engine 2, a turbine runner 8 disposed opposing to the pump impeller 6 to rotate by a flow of fluid from the pump impeller 6, and a stator 10 disposed between the pump impeller 6 and the turbine runner 8 to redirect the fluid flow back to the same direction as impeller rotation, thereby assisting impeller rotation.

The stator 10 is connected to a torque transmission device 16 by a hollow reacting shaft 14 disposed around the input shaft 7. A one-way clutch 12 is fixed on the hollow reacting shaft 14 such that the stator 10 cannot rotate in a direction opposite to a direction of engine rotation.

Figure 2:
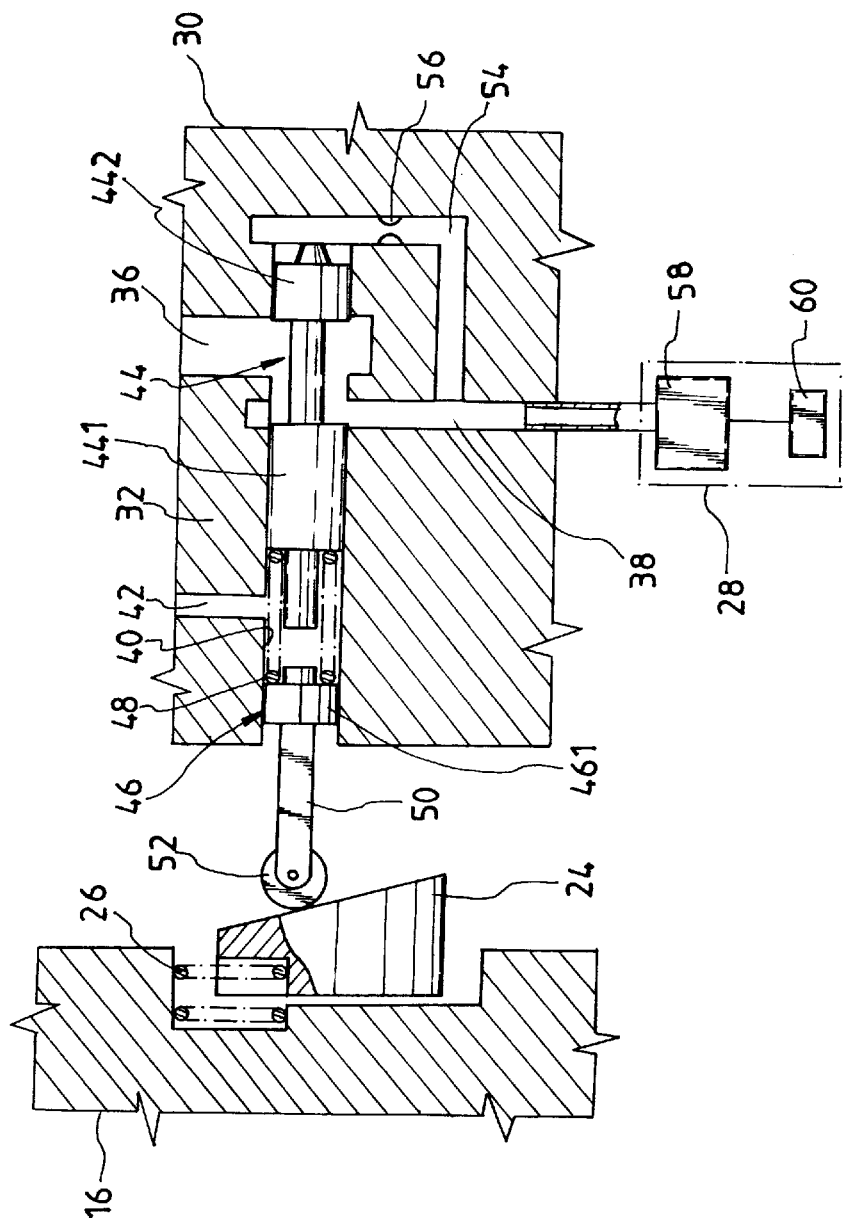
FIG. 2 is a sectional view illustrating an input torque detecting system according to a preferred embodiment of the present invention.
Figure 3:
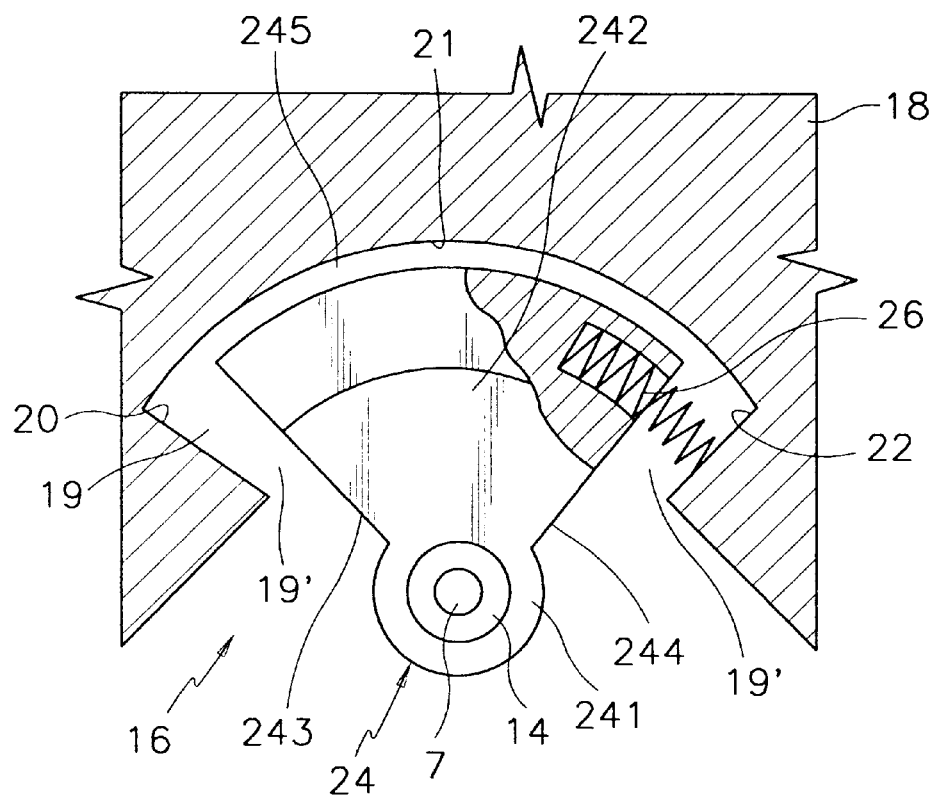
FIG. 3 is a side view illustrating a torque transmission device depicted in FIG. 2.

Referring to FIGS. 2 and 3 illustrating the torque transmission device 16 in detail, a pivot cam member 24 which is fixedly coupled to the hollow reacting shaft 14 is pivotally disposed in a cavity 19 formed in a transmission case 18. That is, as shown in FIG. 3, the pivot cam member 24 is fan-shaped including a converged portion 241 fixed to the hollow reacting shaft 14 and a main body 242 integrally formed with the converged portion 241 and having left and right sides 243 and 244 and an arc portion 245. The cavity 19 is defined by a left wall 20 opposing the left side 243, a right wall 22 opposing the right side 244, and an arc wall 21 opposing the arc portion 245. There are provided clearances 19' between the left side 243 and the left wall 20 and between the right side 244 and the right wall 22. The clearances 19' act as pivotal movement receiving spaces of the pivot cam member 24. That is, when the one-way clutch 12 is operated, the stator 10 rotates in a direction opposite to the rotation of the engine until the pivot cam member 24 contacts the left wall 20. When the pivot member 24 contacts the wall, the stator 10 cannot rotate anymore. For the cam functioning of the pivot cam member 24, a surface of the pivot cam member 24 is designed to be sloped such that thickness thereof is increased as it goes from the left side to the right side (see FIG. 3).

An elastic member such as a compression coil spring 26 is disposed between the right wall 22 and the right side 244 of the pivot cam member 24, urging the pivot cam member 24 leftward.

As shown in FIG. 2, disposed adjacent to the torque transmission device 16 is a torque-hydraulic pressure converter 30 for converting the torque transmitted from the torque transmission device 16 into hydraulic pressure, which is directed from a fluid pump (not shown) to the detecting part 28 in accordance with the variation in engine torque.

The torque-hydraulic pressure converter 30 comprises a valve body 32 having a cavity 40 in which a valve spool 44 and a piston spool 46 are disposed along an common axis. The valve body 32 is provided with a first passage 36 through which supply pressure can be fed to the cavity 40, a second passage 38 through which the supply pressure fed through the first passage 36 is directed to the detecting part 28, and a third passage 42 through which hydraulic pressure is exhausted.

The piston spool 46 is disposed within the cavity 40 to slide along the same in accordance with a pivoting movement of the pivot cam member 24.

The valve spool 44 has a first land 441 for selectively connecting the first and second passages 44 and 38 and a right end second land 442. The piston spool 46 has a land 461, on left face of which a rod 50 is integrally formed. Elastically disposed between a left face of the first land 441 of the valve spool 44 and a right face of the land 461 of the piston spool 46 is an elastic member 48. A roller 52 is rotatably mounted on a free end of the rod 50, contacting the sloped surface of the pivot cam member 24.

The valve body 32 is further provided with a passage 54, branched off from the passage 38, through which the supply pressure acts on a right face of the second land 442 of the valve spool 44 against elastic force of the elastic member 48 so as to prevent the valve spool 44 from being abruptly displaced. To enhance this function, an orifice member 56 is mounted within the passage 54 to delay release of the hydraulic pressure.

The detecting part 28 supplied with the supply pressure from the passage 38 comprises a pressure sensor 58 detecting a level of supplied pressure and a transmission control unit (TCU) 60 receiving a signal from the pressure sensor 58.

The operation of the above described input torque detecting system will be described hereinafter.

When the engine torque is transmitted to the reacting shaft 14, the pivot cam member 24 pivots, overcoming the elastic force of the elastic member 26 in proportion to engine torque.

Therefore, the roller 52 contacting the sloped surface of the pivot cam member 24 is moved along the surface relative to the movement of the pivot cam member 24, displacing the piston spool 46 toward the valve spool 44 while overcoming the elastic force of the elastic member 48 to push the valve spool 44 rightward. At this point, According to a degree of the pushing force, an opening of a port communicating the cavity 40 with the passage 38 is varied, thereby changing the amount of the supply pressure directed to the pressure sensor 58.

As described above, by varying the opening of the port directed to the pressure sensor in accordance with the change in engine torque, the supply pressure directed to the pressure sensor 58 is changed. This change it pressure is detected by the pressure sensor 58 and is then transmitted to the transmission control unit 60 as a signal.

The signal transmitted to the transmission control unit 60 is used as input torque signal for controlling many parts of the transmission unit.

Although a preferred embodiment of the present invention has been described in detail hereinabove, it should be clearly understood that many variations and/or modifications of the basic skilled in the present art will still fall within the spirit and scope of the present invention, as defined in the appended claims.

What is claimed is:

1. An input torque detecting system of an automotive transmission comprising a torque converter having a pump impeller directly connected to a crankshaft of an engine, a turbine runner disposed opposing to the pump impeller to rotate by fluid thrown from the pump impeller, and a stator disposed between the pump impeller and the turbine runner to redirect the fluid flow back to the same direction as impeller rotation to assist impeller rotation, the input torque detecting system comprising:

a reacting shaft disposed around the input shaft and fixed on one end to the stator;

an input torque transmitting device fixed on the other end of the reacting shaft, the input torque transmitting device being pivotable by a predetermined angle and operating by a predetermined distance synchronously in accordance with a rotation of the stator;

a torque-hydraulic pressure converter converting input torque transmitted from the input torque transmitting device into hydraulic pressure; and a detector detecting a level of converted hydraulic pressure, wherein the torque-hydraulic pressure converter comprises a valve body having a first passage supplied with hydraulic pressure from a hydraulic source and a second passage supplying hydraulic pressure to the detector.

2. The input torque detecting system according to claim 1 wherein the input torque transmitting device comprises a pivot cam member pivotally disposed in a receiving space of a transmission case, and an elastic member disposed between the pivot cam member and a wall of the transmission case defining the receiving space so as to bias the pivot cam member against a pivot direction of the pivot cam member.

3. The input torque detecting system according to claim 2 wherein the torque-hydraulic pressure converter comprises communication regulating means for regulating communication of the first passage with the second passage in accordance with a pivotal movement of the pivot cam member.

4. The input torque detecting system according to claim 3 wherein the communication regulating means comprises a piston spool cooperating with the pivotal movement of the pivot cam member and a valve spool cooperating with the piston spool for regulating the communication of the first and second passages, the valve spool and the piston spool being disposed in the valve body.

5. The input torque detecting system according to claim 4 wherein the piston spool is provided with a roller contacting the pivot cam member, a surface of the pivot cam member contacting the roller being sloped.

6. The input torque detecting system according to claim 3 wherein an elastic member is disposed between the valve spool and the piston spool.

7. The input torque detecting system according to claim 4 wherein part of the hydraulic pressure fed to the second passage is applied to the valve spool through a branch passage branched off from the second passage so as to bias the valve spool against a displacement of the piston spool, thereby preventing the valve spool from being abruptly displaced.

8. The input torque detecting system according to claim 7 wherein an orifice member is disposed within the branch passage.

9. The input torque detecting system according to claim 1 wherein the detector comprises a pressure sensor detecting a level of supplied pressure and a transmission control unit receiving a detected signal from the pressure sensor.

10. The input torque detecting system according to claim 3, wherein the second passage supplies the hydraulic pressure fed through the first passage to the detector.

11. The input torque detecting system according to claim 1, wherein the hydraulic source is a fluid pump.

* * * * *